US012725210B2

(12) United States Patent
Park

(10) Patent No.: US 12,725,210 B2
(45) Date of Patent: Sep. 1, 2026

(54) SYSTEM AND METHOD FOR CULTIVATING ROUGHAGE

(71) Applicant: ELECTRONICS AND TELECOMMUNICATIONS RESEARCH INSTITUTE, Daejeon (KR)

(72) Inventor: Juyoung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 405 days.

(21) Appl. No.: 18/485,658

(22) Filed: Oct. 12, 2023

(65) Prior Publication Data

US 2024/0122125 A1 Apr. 18, 2024

(30) Foreign Application Priority Data

Oct. 14, 2022 (KR) ........................ 10-2022-0132648
May 25, 2023 (KR) ........................ 10-2023-0067404

(51) Int. Cl.
*G06Q 50/02* (2024.01)

(52) U.S. Cl.
CPC .................................... *G06Q 50/02* (2013.01)

(58) Field of Classification Search
CPC .......... G06Q 50/02; A01G 9/24; A01G 31/02; A01G 7/045; Y02A 40/25
See application file for complete search history.

(56) References Cited

U.S. PATENT DOCUMENTS

| | | | | |
|---|---|---|---|---|
| 9,116,140 | B2 | 8/2015 | Moon et al. | |
| 9,226,454 | B2 | 1/2016 | Kim et al. | |
| 2016/0278304 | A1* | 9/2016 | Elsegood | A01G 7/045 |
| 2016/0286736 | A1 | 10/2016 | Shimazu | |
| 2017/0161560 | A1* | 6/2017 | Itzhaky | G06N 3/08 |
| 2020/0208053 | A1* | 7/2020 | Bonini | C05B 7/00 |
| 2021/0235612 | A1* | 8/2021 | Tewari | G06V 20/188 |
| 2021/0378161 | A1* | 12/2021 | Kerr | G06Q 50/02 |
| 2022/0046866 | A1* | 2/2022 | Lei | A01G 9/24 |
| 2023/0102560 | A1* | 3/2023 | Morel | A01G 7/045 702/2 |
| 2023/0143014 | A1* | 5/2023 | Nguyen | G06T 7/0012 47/17 |

(Continued)

FOREIGN PATENT DOCUMENTS

| | | | |
|---|---|---|---|
| JP | 2022133359 | A | 9/2022 |
| KR | 1020150133828 | A | 11/2015 |

(Continued)

OTHER PUBLICATIONS

Xu, J., Meng, J. and Quackenbush, L.J., 2019. Use of remote sensing to predict the optimal harvest date of corn. Field Crops Research, 236, pp. 1-13. (Year: 2019).*

*Primary Examiner* — Alicia M. Choi
(74) *Attorney, Agent, or Firm* — Rabin & Berdo, P.C.

(57) ABSTRACT

A system and a method for cultivating roughage are disclosed. The system includes a cultivator console for providing user interface to a grower, a cultivation server for calculating a cultivation environment adjustment value for the roughage based on information received from the cultivator console, and a cultivation apparatus for controlling the environment of a cultivation space for cultivating the roughage based on the cultivation environment adjustment value.

12 Claims, 9 Drawing Sheets

(56) References Cited

U.S. PATENT DOCUMENTS

| | | | | |
|---|---|---|---|---|
| 2023/0177622 | A1* | 6/2023 | Bull | G06Q 50/02 705/7.11 |
| 2023/0210062 | A1* | 7/2023 | Luo | A01G 9/26 47/17 |
| 2024/0341244 | A1* | 10/2024 | Kim | A01G 9/24 |

FOREIGN PATENT DOCUMENTS

| | | | |
|---|---|---|---|
| KR | 1020150137485 | A | 12/2015 |
| KR | 101711058 | B1 | 2/2017 |
| KR | 1020180038861 | A | 4/2018 |
| KR | 102427079 | B1 | 7/2022 |
| KR | 1020220094538 | A | 7/2022 |
| KR | 102428812 | B1 | 8/2022 |
| KR | 102434670 | B1 | 8/2022 |

* cited by examiner

SYSTEM AND METHOD FOR CULTIVATING ROUGHAGE

CROSS-REFERENCE TO RELATED APPLICATION

The present application claims priority to Korean Patent Application No. 10-2022-0132648, filed on Oct. 14, 2022, and Korean Patent Application No. 10-2023-0067404, filed on May 25, 2023, the disclosures of which are incorporated by reference herein in their entireties.

TECHNICAL FIELD

The present disclosure relates to a system and a method for cultivating roughage.

BACKGROUND

The statements in this section merely provide background information related to the present disclosure and do not necessarily constitute prior art.

In animal husbandry, feed refers to organic or inorganic substances containing various nutrients required for life support and production activities of livestock. In particular, roughage is straw, hay, soilage crop, etc. with a low content of fat, protein, starch, etc. and a fiber content of 18% or more, and is a generic term for a feed that has a low content of digestible nutrients compared to its volume and is high in fiber.

In the meantime, an apparatus for cultivating roughage may be constructed by installing cultivation equipment for checking a cultivation environment and adjusting the cultivation environment in a building for cultivating the roughage. The building may be divided into a cultivation space and a management space. Here, the cultivation space may be a space for growing roughage, and the management space may be a space for adjusting the cultivation environment.

A grower can adjust the environment of the cultivation space by operating the apparatus for cultivating roughage according to the cultivation phase of the roughage. However, in the case of a conventional apparatus for cultivating roughage, because a grower operates the cultivation apparatus using a control panel installed in a management space, it is difficult for the grower to control the cultivation apparatus remotely. In addition, in the case of the conventional apparatus for cultivating roughage, the number of control panels increases as the number of the cultivation apparatuses increases, resulting in an increase in the cost of controlling the cultivation apparatuses.

SUMMARY

According to an aspect of the present disclosure provides a method for cultivating roughage based on a cultivator console and a cultivation server, with a cultivation apparatus for controlling the environment of a cultivation space for cultivating the roughage. The method includes receiving, by the cultivation server, cultivation information including a cultivation environment mode, a grower's environmental target, a request for a start of growing the roughage, and an alarm about the start of harvesting the roughage from the cultivator console, receiving, by the cultivation server, information about an environmental state of the cultivation space and information about an operating state of the cultivation apparatus from the cultivation apparatus, generating, by the cultivation server, an environmental state value based on the information about the environmental state, calculating, by the cultivation server, the growth time of the roughage based on the request for the start of growing the roughage and the alarm about the start of harvesting the roughage, determining, by the cultivation server, a cultivation phase in which the roughage is based on the growth time, generating, by the cultivation server, an environmental target for the roughage based on the cultivation phase, calculating, by the cultivation server, a cultivation environment adjustment value for the roughage based on the environmental state value and the environmental target, transmitting, by the cultivation server, the cultivation environment adjustment value to the cultivation apparatus, and adjusting, by the cultivation apparatus, the environment of the cultivation space based on the cultivation environment adjustment value.

According to another aspect of the present disclosure provides a system for cultivating roughage having a cultivation apparatus for controlling the environment of a cultivation space for cultivating the roughage. The system includes a cultivator console and a cultivation server. The cultivator console is configured to transmit cultivation information including a cultivation environment mode, a grower's environmental target, a request for the start of growing the roughage, and an alarm about the start of harvesting the roughage. The cultivation server is configured to receive the cultivation information from the cultivator console, receive information about the environmental state of the cultivation space and information about operating state of the cultivation apparatus from the cultivation apparatus, generate an environmental state value based on the information about the environmental state, calculate a growth time of the roughage based on the request for the start of growing the roughage and the alarm about the start of harvesting the roughage, determine a cultivation phase in which the roughage is based on the growth time, generate an environmental target for the roughage based on the cultivation phase, calculate a cultivation environment adjustment value for the roughage based on the environmental state value and the environmental target, store a cultivation environment data set including time, the growth time, the cultivation phase, the environmental target, and the environmental state value for each cultivation space, and transmit the cultivation environment adjustment value to the cultivation apparatus and transmits the information about the operating state of the cultivation apparatus and the cultivation environment data set corresponding to cultivation information to the cultivator console in order to remotely control the cultivation apparatus.

DETAILED DESCRIPTION

Figure 1:
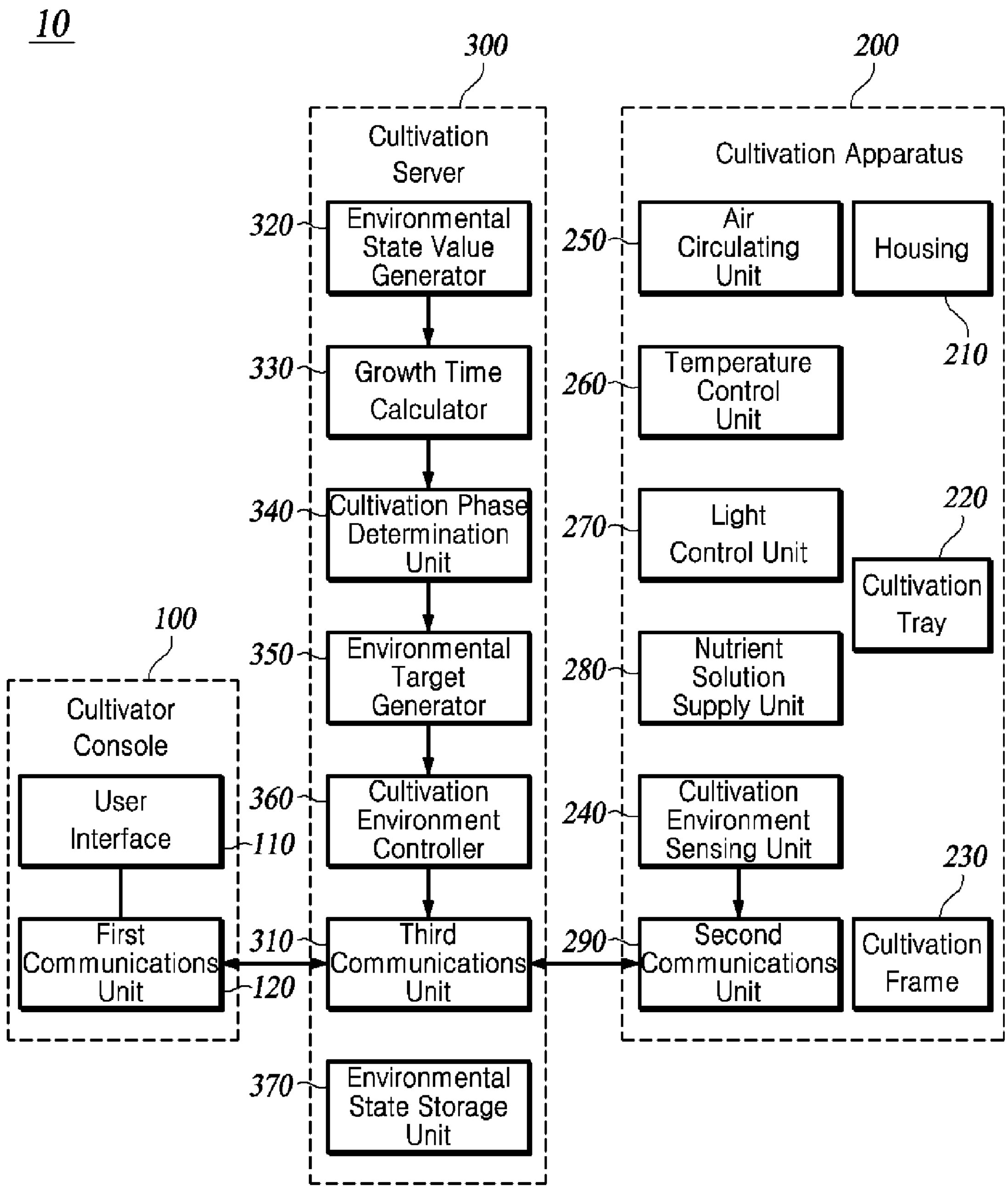
FIG. 1 is a schematic block diagram of a system for cultivating roughage according to an embodiment of the present disclosure.

The present disclosure in some embodiments may provide a function for a grower to control an apparatus for cultivating roughage remotely by establishing a cloud-based system for cultivating roughage.

The present disclosure in some embodiments may provide the cloud-based system for cultivating roughage to prevent the cost of controlling apparatuses for cultivating roughage from being increased as the number of the cultivation apparatuses increases.

Features achievable by embodiments of the present disclosure are not limited to the above-mentioned features, and other features not mentioned may be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present disclosure and is not intended to represent the only embodiments in which the present disclosure may be practiced.

FIG. 1 is a schematic block diagram of a system for cultivating roughage according to an embodiment of the present disclosure.

Referring to FIG. 1, the system for cultivating roughage 10 according to an embodiment of the present disclosure may include all or some of a cultivator console 100, a cultivation apparatus 200, and a cultivation server 300.

The cultivator console 100 may receive a command for a remote cultivation control from a grower. For example, the cultivator console 100 may receive the cultivation environment mode, the grower's manual environmental target, the request for the start of growing the roughage, and the alarm about the start of harvesting the roughage from the grower who monitors the environmental state of the cultivation space. To this end, the cultivator console 100 may include both or one of a user interface 110 and a first communications unit 120.

The user interface 110 may be configured to provide a function for the grower to generate a cultivation environment mode, the grower's manual environmental target, a request for the start of growing roughage in a cultivation space, an alarm about the start of harvesting the roughage, etc.

The first communications unit 120 may transmit, to the cultivation server 300, cultivation information including a cultivation environment mode, a grower's manual environmental target, a request for the start of growing roughage in a cultivation space, an alarm about the start of harvesting the roughage, etc.

The cultivation apparatus 200 may include all or some of a housing 210, a cultivation tray 220, a cultivation frame 230, a cultivation environment sensing unit 240, an air circulating unit 250, a temperature control unit 260, a light control unit 270, a nutrient solution supply unit 280, and a second communications unit 290.

The housing 210 may be divided into a management space for controlling a cultivation space and a cultivation environment for growing roughage.

The cultivation tray 220 may be configured to accommodate roughage from the sowing of seeds of the roughage to the harvest of the roughage, and may be configured to be detachable from the cultivation frame 230 for periodic cleaning.

The cultivation frame 230 may partition a cultivation space, and a cultivation tray 220 may be disposed in each partitioned cultivation space.

The cultivation environment sensing unit 240 may be configured to sense the environmental state of a cultivation space and generate information about the environmental state of the cultivation space.

The air circulating unit 250 may be configured to circulate air inside a cultivation space. In addition, the air circulating unit 250 may be configured to introduce external air into a cultivation space and discharge internal air out of the cultivation space.

The temperature control unit 260 may be configured to control the temperature inside a cultivation space.

The light control unit 270 may be configured to control the amount of light that irradiates the roughage.

The nutrient solution supply unit 280 may be configured to supply a nutrient solution and/or water to roughage.

The second communications unit 290 may transmit information on the environmental state of a cultivation space to the cultivation server 300.

The cultivation server 300 may include all or some of a third communications unit 310, an environmental state value generator 320, a growth time calculator 330, a cultivation phase determination unit 340, an environmental target generator 350, a cultivation environment controller 360, and an environmental state storage unit 370.

The third communications unit 310 may receive cultivation information from the cultivator console 100 via the first communications unit 120. The third communications unit 310 may receive information on the environmental state of a cultivation space and information on an operating state of the cultivation apparatus 200 from the cultivation apparatus 200 via the second communications unit 290. The third communications unit 310 may transmit a cultivation environment adjustment value to the cultivation apparatus 200 via the second communications unit 290. In addition, the third communications unit 310 may transmit information on the operating state of the cultivation apparatus 200 and a cultivation environment data set corresponding to cultivation information to the cultivator console 100 via the first communications unit 120.

The environmental state value generator 320 may generate an environmental state value based on information on the environmental state of a cultivation space.

The growth time calculator 330 may calculate the growth time of roughage in a cultivation space based on a request for the start of growing the roughage and an alarm about the start of harvesting the roughage.

The cultivation phase determination unit 340 may determine the cultivation phase in which roughage in a cultivation space is based on the growth time of the roughage.

The environmental target generator 350 may generate an environmental target of roughage in a cultivation space based on the cultivation phase of the roughage.

The cultivation environment controller 360 may calculate a cultivation environment adjustment value for a cultivation environment target based on an environmental state value.

The environmental state storage unit 370 may store an operation history of the cultivation apparatus 200. The environmental state storage unit 370 may store a cultivation environment data set including a current time, a growth time, a cultivation phase, an environmental target, an environmental state value, etc. for each cultivation space.

Figure 2A:
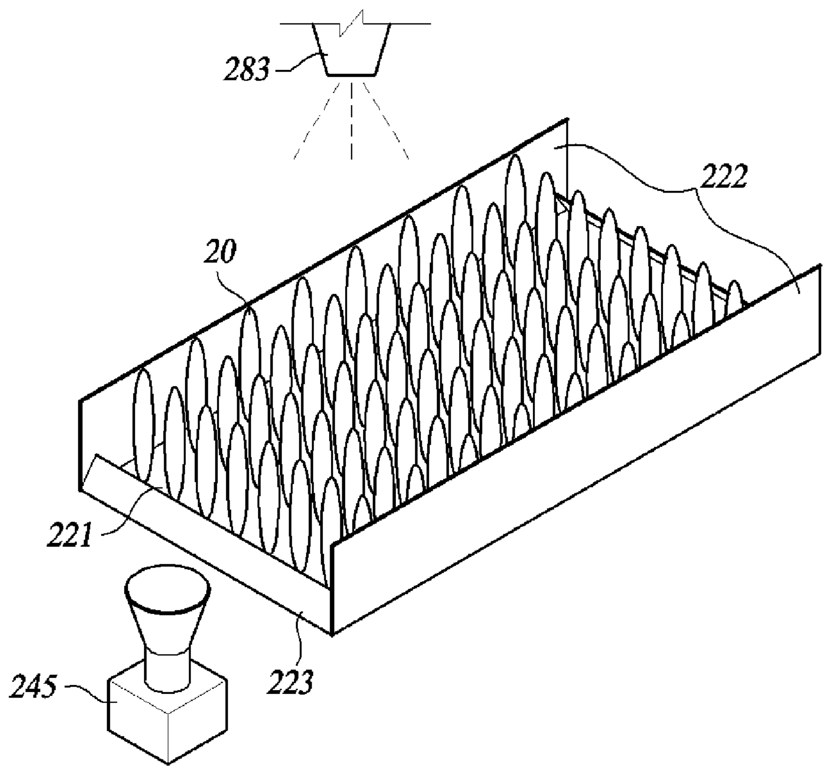
FIGS. 2A and 2B are conceptual views of an apparatus for cultivating roughage according to an embodiment of the present disclosure.
Figure 2B:
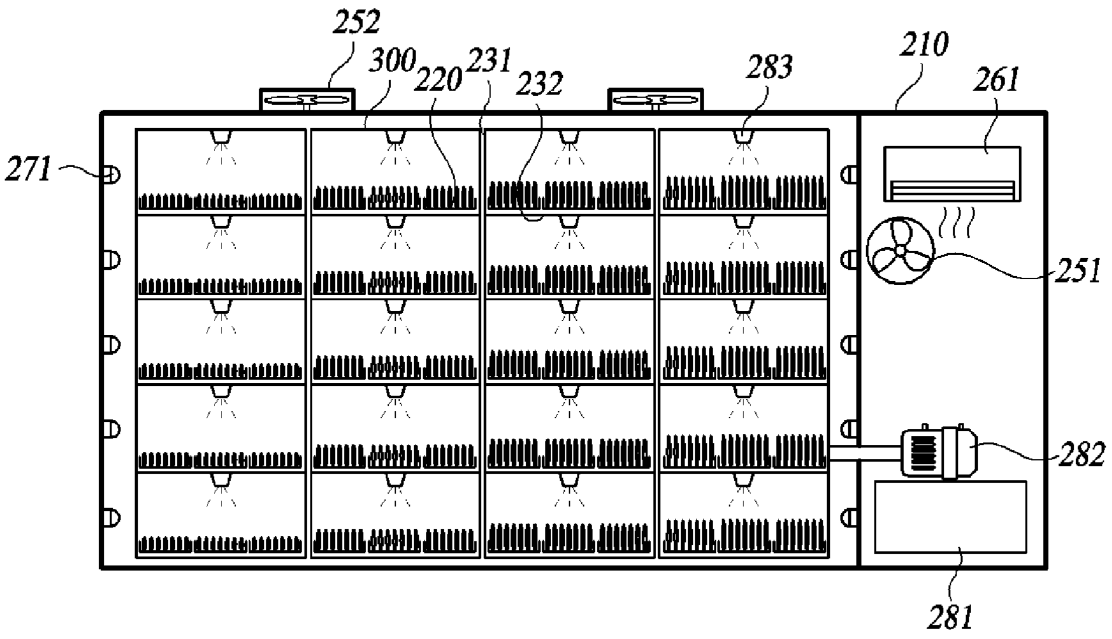

FIGS. 2A and 2B are conceptual views of an apparatus for cultivating roughage according to an embodiment of the present disclosure.

Referring to FIGS. 1 and 2A, the cultivation tray 220 may include all or some of a bottom plate 221, a side wall 222, and a ledge 223. The bottom plate 221 may be configured to accommodate roughage, nutrient solution, and/or water. The side wall 222 may be configured to extend vertically from some of the sides of the bottom plate 221 in order to support roughage 20. The ledge 223 may be configured to extend from the other sides of the bottom plate 221 so that the cultivation tray 220 may accommodate nutrient solution and/or water.

The housing 210 may include both or one of a first door (not shown) and a second door (not shown). The first door may be installed for a grower to enter and exit a cultivation space and may be configured to facilitate the sowing of seeds of roughage and the harvest of the roughage. For example, the first door may be configured to be opened and closed vertically. The second door may be installed for a grower to enter and exit a management space.

Referring to FIG. 2B, the cultivation frame 230 may include both or one of a vertical frame 231 and a horizontal frame 232. The vertical frame 231 may divide a cultivation space into a plurality of cultivation spaces based on a seeding time, and the horizontal frame 232 may divide each partitioned cultivation space into a plurality of cultivation floors. For example, a first cultivation space may be a space for cultivating roughage in the first growth phase of promoting seed germination, and may be divided into five cultivation floors.

The cultivation environment sensing unit 240 may include all or some of a temperature sensor (not shown), a humidity sensor (not shown), an illuminance sensor (not shown), and a sensor for sensing leakage 245. The temperature sensor, the humidity sensor, and the illuminance sensor may be installed in a cultivation space to measure the temperature, humidity, and illuminance of the cultivation space, respectively. The sensor for sensing leakage 245 may be installed between the ledge 223 and a drain (not shown) and determine whether a nutrient solution and/or water supplied to the cultivation tray 220 leaks as shown in FIG. 2A.

The air circulating unit 250 may include both or one of a circulation fan 251 and a ventilation fan 252. The circulation fan 251 may be installed in a management space and connected to a cultivation space to circulate air in the cultivation space. The ventilation fan may be installed in a cultivation space, and may bring external air into the cultivation space and discharge air inside the cultivation space to the outside.

The temperature control unit 260 may include an air conditioner 261. The air conditioner 261 may be installed in a management space and control the temperature inside a cultivation space.

The light control unit 270 may include lighting 271. The lighting 271 may be configured to irradiate the roughage with light.

The nutrient solution supply unit 280 may include all or some of a nutrient solution tank 281, a nutrient solution pump 282, and a spray nozzle 283. The nutrient solution tank 281 may be installed in a management space to store nutrient solution and/or water. The nutrient solution pump 282 may be installed in a management space and may be configured to supply a nutrient solution and/or water from the nutrient solution tank 281 to the spray nozzle 283. The spray nozzle 283 may be installed in a cultivation space and may be configured to spray a nutrient solution and/or water to roughage in the cultivation space.

Figure 3:
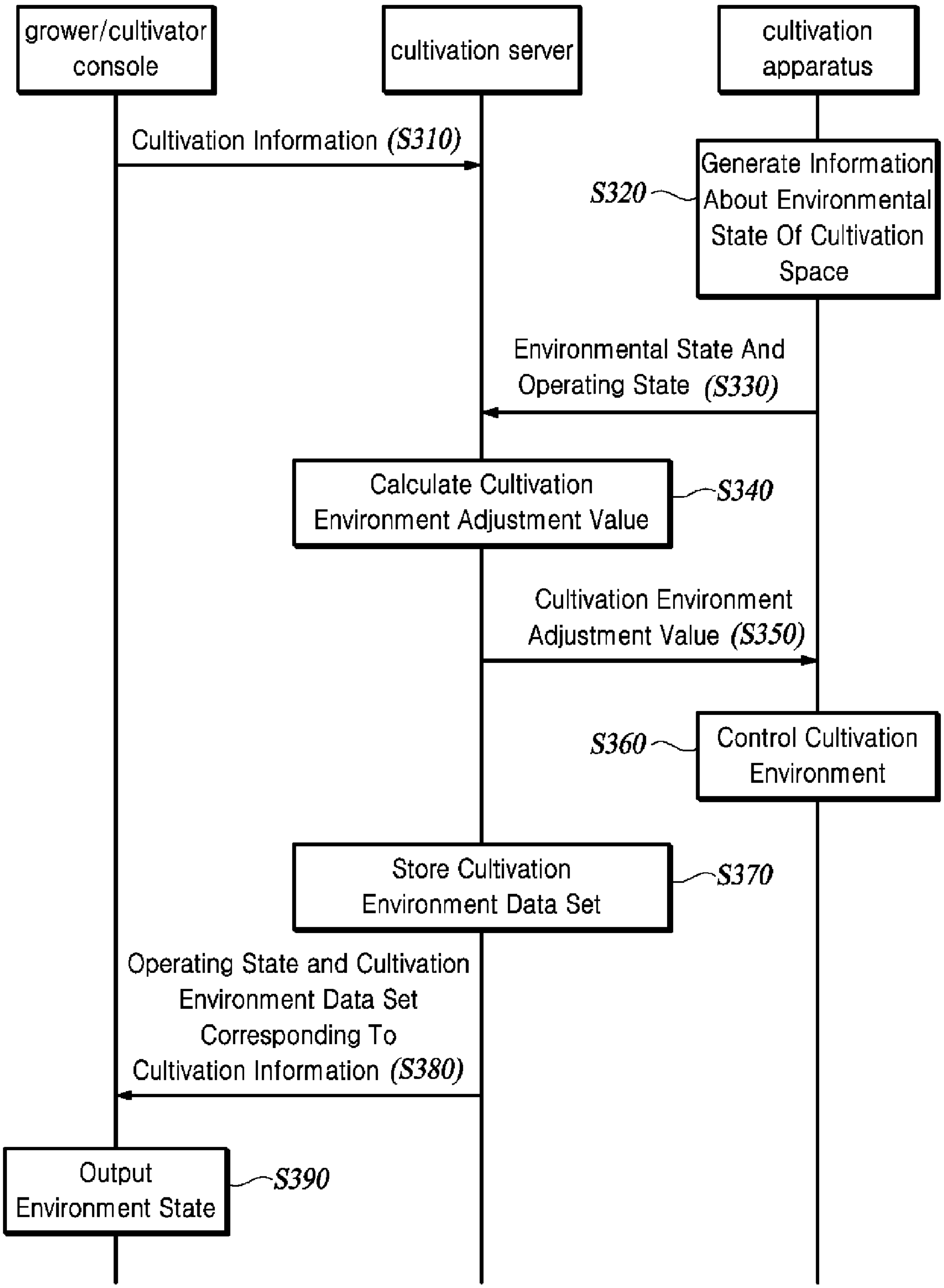
FIG. 3 is a flow chart of a process in which the system for cultivating roughage remotely controls a cultivation environment in a cultivation space to cultivate roughage according to an embodiment of the present disclosure.

FIG. 3 is a flow chart of a process in which the system for cultivating roughage remotely controls a cultivation environment in a cultivation space to cultivate roughage according to an embodiment of the present disclosure.

Referring to FIGS. 1 to 3, the cultivation server 300 may receive, from the cultivator console 100, cultivation information (S310). The cultivation information may include a cultivation environment mode, a grower's manual environmental target, a request for the start of growing roughage in a cultivation space, an alarm about the start of harvesting the roughage, etc.

The cultivation apparatus 200 may generate information about the environmental state of a cultivation space using the temperature sensor, the humidity sensor, the illuminance sensor, and the sensor for sensing leakage (S320).

The cultivation server 300 may receive, from the cultivation apparatus 200, information on the environmental state of a cultivation space and information on an operating state of the cultivation apparatus 200 (S330).

The cultivation server 300 may calculate a cultivation environment adjustment value for a cultivation environment target using the information about the environmental state of the cultivation space (S340).

The cultivation server 300 may transmit the cultivation environment adjustment value to the cultivation apparatus 200 (S350).

The cultivation apparatus 200 may control the cultivation environment based on the cultivation environment adjustment value (S360).

The cultivation server 300 may store a cultivation environment data set including a current time, a growth time, a cultivation phase, an environmental target, an environmental state value, etc. for each cultivation space (S370).

The cultivation server 300 may transmit information on the operating state of the cultivation apparatus 200 and a cultivation environment data set corresponding to cultivation information to the cultivator console 100 (S380).

The cultivator console 100 may output information about the environmental state of the cultivation space to the user interface 110 based on the cultivation environment data set corresponding to cultivation information (S390). Through the processes described above, a grower may monitor the environmental state of the cultivation space using the user interface 110 and may control the process of cultivation remotely.

Figure 4:
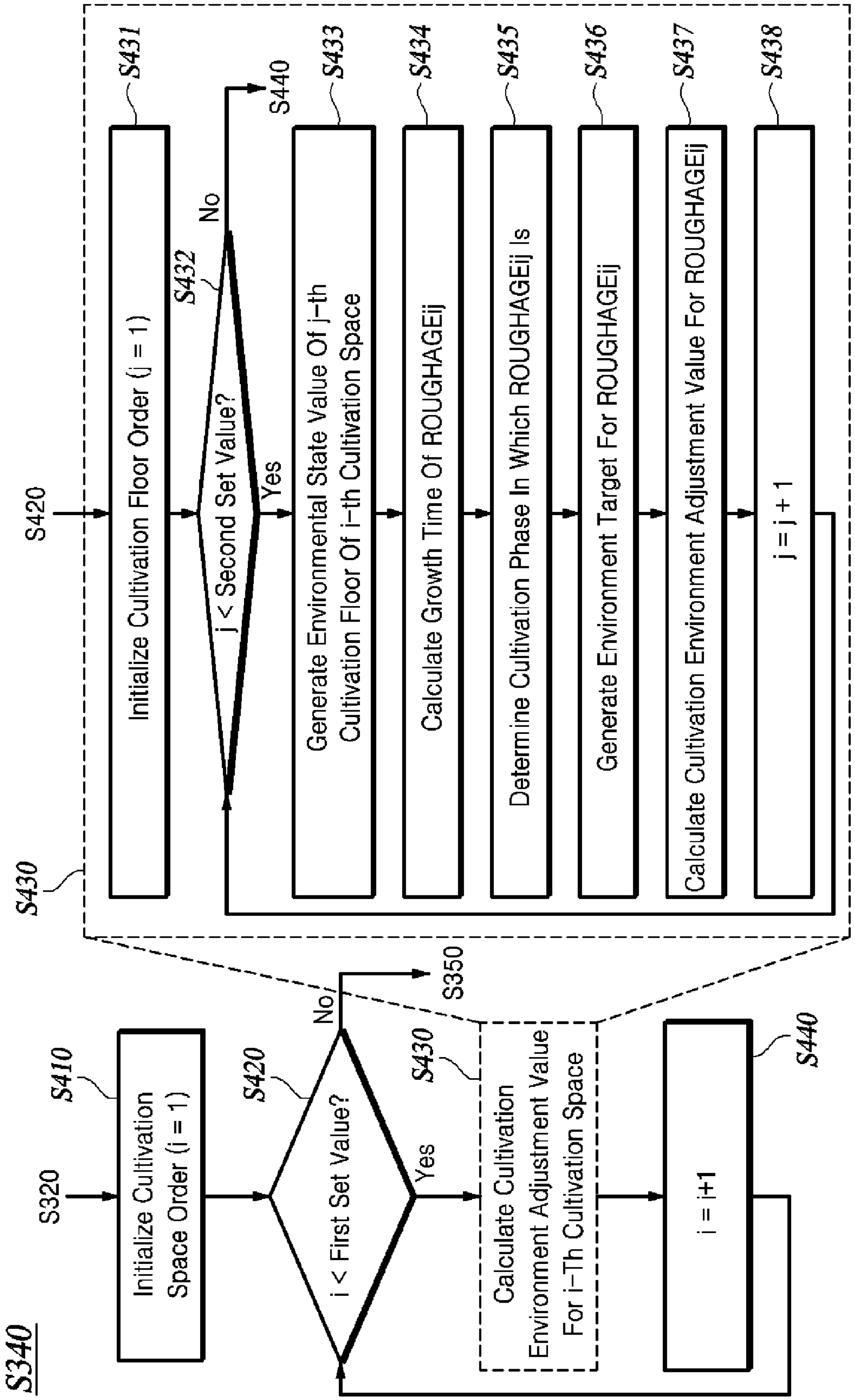
FIG. 4 is a flow chart for describing an example of a process for calculating a cultivation environment adjustment value.

FIG. 4 is a flow chart for describing an example of a process for calculating a cultivation environment adjustment value Referring to FIGS. 1 to 4, for example, a cultivation space may be divided into a first cultivation space, a second cultivation space, a third cultivation space, and a fourth cultivation space based on a sowing time, and each cultivation space may be divided into five cultivation floors. In FIGS. 4 to 7, the term of "ROUGHAGEij" refers roughage in a j-th cultivation floor of an i-th cultivation space.

The cultivation server 300 may initialize a cultivation space order i (i is a natural number) to 1 (S410). Accordingly, in step S340, a cultivation environment adjustment value for the first cultivation space may be calculated first.

The cultivation server 300 may determine whether a cultivation space order i is smaller than a first set value (S420). For example, the first set value may be five. When the cultivation space order i is equal to or greater than the first set value, the flow proceeds to step S350. Accordingly, in step S340, a cultivation environment adjustment value for the fourth cultivation space may be finally calculated.

When it is determined that the cultivation space order i is smaller than the first set value at step S420, the cultivation server 300 may calculate a cultivation environment adjustment value for an i-th cultivation space (S430). In step S430, the cultivation server 300 may sequentially calculate the cultivation environment adjustment value for the roughage in each cultivation floor of the i-th cultivation space.

To this end, the cultivation server 300 may initialize a cultivation floor order j (j is a natural number) to 1 (S431). Accordingly, the cultivation environment adjustment value for roughage in a first cultivation floor of the i-th cultivation space may be calculated first.

The cultivation server 300 may determine whether the cultivation floor order j is smaller than a second set value (S432). For example, the second set value may be six. When the cultivation floor order j is equal to or greater than the second set value, the flow proceeds to step S440. Accordingly, in step S430, a cultivation environment adjustment value for roughage in a fifth cultivation floor of the i-th cultivation space may be finally calculated.

When it is determined that the cultivation floor order is smaller than the second set value at step S432, the environmental state value generator 320 may generate an environmental state value of a j-th cultivation floor of an i-th cultivation space based on information on a cultivation environment state (S433).

The growth time calculator 330 may calculate the growth time of roughage in a j-th cultivation floor of an i-th cultivation space (S434).

The cultivation phase determination unit 340 may determine the cultivation phase in which roughage in a j-th cultivation floor of an i-th cultivation space is (S435).

The environmental target generator 350 may generate a cultivation environment target for roughage in a j-th cultivation floor of an i-th cultivation space (S436).

The cultivation environment controller 360 may calculate cultivation environment adjustment values for roughage in a j-th cultivation floor of an i-th cultivation space (S437).

the cultivation server 300 may increase the cultivation floor order j by 1 (S438). Accordingly, the cultivation server 300 may repeatedly perform S430 in order from a first cultivation floor of an i-th cultivation space to a fifth cultivation floor of the i-th cultivation space.

When it is determined that the cultivation floor order j is equal to or greater than the second set value at step S432, the cultivation server 300 may increase the cultivation space order i by 1 (S440).

Figure 5:
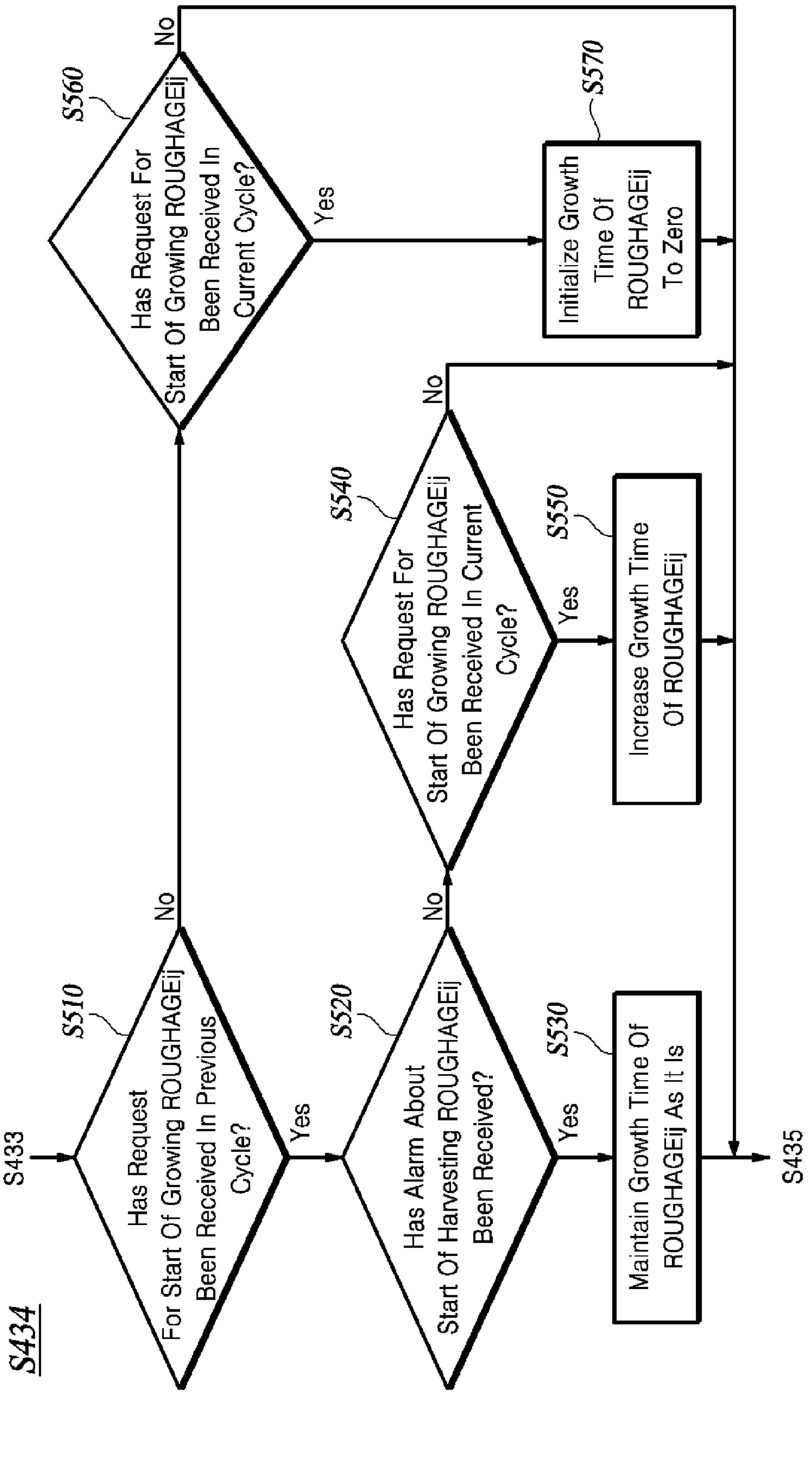
FIG. 5 is a flow chart for describing an example of a process for calculating a growth time.

FIG. 5 is a flow chart for describing an example of a process for calculating a growth time.

Referring to FIGS. 1 to 5, the growth time calculator 330 may determine whether or not a request for the start of growing roughage in a j-th cultivation floor of an i-th cultivation space has been received in the previous cycle (S510).

When it is determined at step S510 that the request for the start of growing the roughage in the j-th cultivation floor of the i-th cultivation space has been received in the previous cycle, the growth time calculator 330 may determine whether an alarm about the start of harvesting the roughage in the j-th cultivation floor of the i-th cultivation space has been received in a current cycle (S520).

When it is determined at step S520 that the alarm about the start of harvesting the roughage in the j-th cultivation floor of the i-th cultivation space has been received in the current cycle, the growth time calculator 330 may maintain the growth time of the roughage in the j-th cultivation floor of the i-th cultivation space as it is (S530).

When it is not determined at step S520 that the alarm about the start of harvesting the roughage in the j-th cultivation floor of the i-th cultivation space has been received in the current cycle, the growth time calculator 330 may determine whether or not the request for the start of growing the roughage in the j-th cultivation floor of the i-th cultivation space has been received in the current cycle (S540).

When it is determined at step S540 that the request for the start of growing the roughage in the j-th cultivation floor of the i-th cultivation space has been received in the current cycle, the growth time calculator 330 may increase the growth time of the roughage in the j-th cultivation floor of the i-th cultivation space (S550).

When it is not determined at step S510 that the request for the start of growing the roughage in the j-th cultivation floor of the i-th cultivation space has been received in the previous cycle, the growth time calculator 330 may determine whether or not the request for the start of growing the roughage in the j-th cultivation floor of the i-th cultivation space has been received in the current cycle (S560).

When it is determined at step S560 that the request for the start of growing the roughage in the j-th cultivation floor of the i-th cultivation space has been received in the current cycle, the growth time calculator 330 may initialize the growth time of the roughage in the j-th cultivation floor of the i-th cultivation space to zero (S570).

Figure 6:
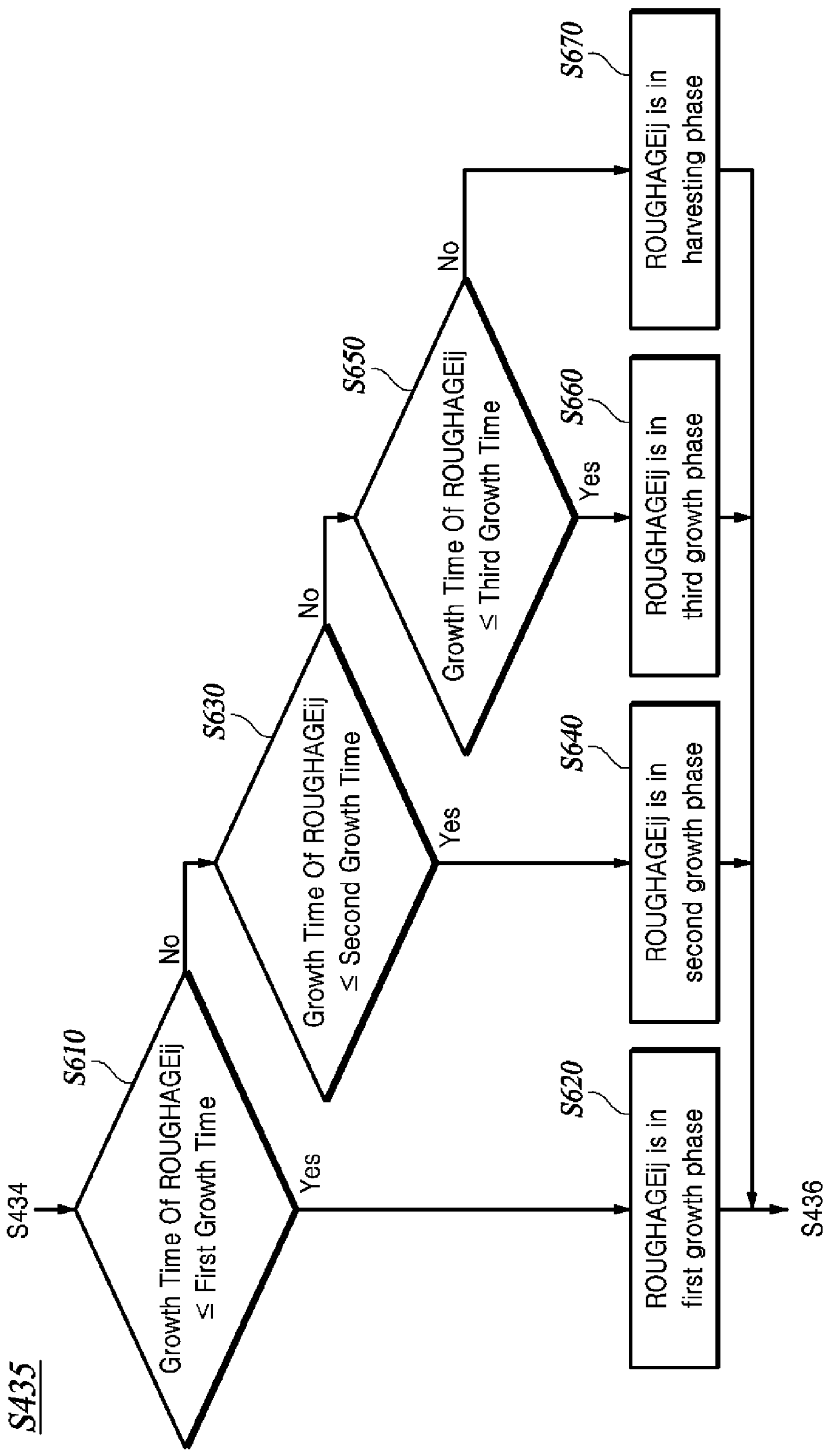
FIG. 6 is a flow chart for describing an example of a process for determine the cultivation phase.

FIG. 6 is a flow chart for describing an example of a process for determine the cultivation phase.

Referring to FIGS. 1 to 6, the cultivation phase determination unit 340 may determine whether the growth time of roughage in a j-th cultivation floor of an i-th cultivation space is less than or equal to a first growth time (S610).

When it is determined at step S610 that the growth time of the roughage in the j-th cultivation floor of the i-th cultivation space is less than or equal to the first growth time, the cultivation phase determination unit 340 may determine that the roughage in the j-th cultivation floor of the i-th cultivation space is in the first growth phase (S620). For example, the first growth phase may be a phase for promoting germination of seeds of roughage.

When it is determined at step S610 that the growth time of the roughage in the j-th cultivation floor of the i-th cultivation space is greater than the first growth time, the cultivation phase determination unit 340 may determine whether the growth time of the roughage in the j-th cultivation floor of the i-th cultivation space is less than or equal to a second growth time (S630).

When it is determined at step S630 that the growth time of the roughage in the j-th cultivation floor of the i-th cultivation space is less than or equal to the second growth time, the cultivation phase determination unit 340 may determine that the roughage in the j-th cultivation floor of the i-th cultivation space is in a second growth phase (S640). For example, the second growth phase may be a phase in which germination of seeds of roughage has begun.

When it is determined at step S630 that the growth time of the roughage in the j-th cultivation floor of the i-th cultivation space is greater than the second growth time, the cultivation phase determination unit 340 may determine whether the growth time of the roughage in the j-th cultivation floor of the i-th cultivation space is less than or equal to a third growth time (S650).

When it is determined at step S650 that the growth time of the roughage in the j-th cultivation floor of the i-th cultivation space is less than or equal to the third growth time, the cultivation phase determination unit 340 may determine that the roughage in the j-th cultivation floor of the i-th cultivation space is in a third growth phase (S660). For example, the third growth phase may be a phase for growing roughage.

When it is determined at step S650 that the growth time of the roughage in the j-th cultivation floor of the i-th cultivation space is greater than the third growth time, the cultivation phase determination unit 340 may determine that the roughage in the j-th cultivation floor of the i-th cultivation space is in a harvesting phase (S670). For example, during the harvesting phase, a grower may separate the cultivation tray 220 from the cultivation frame 230 and send the separated cultivation tray to a workplace in order to harvest the roughage 20. In addition, the grower may wash the cultivation tray 220 and clean up the cultivation frame 230 and the cultivation space in order to prevent contamination of the cultivation space.

Figure 7:
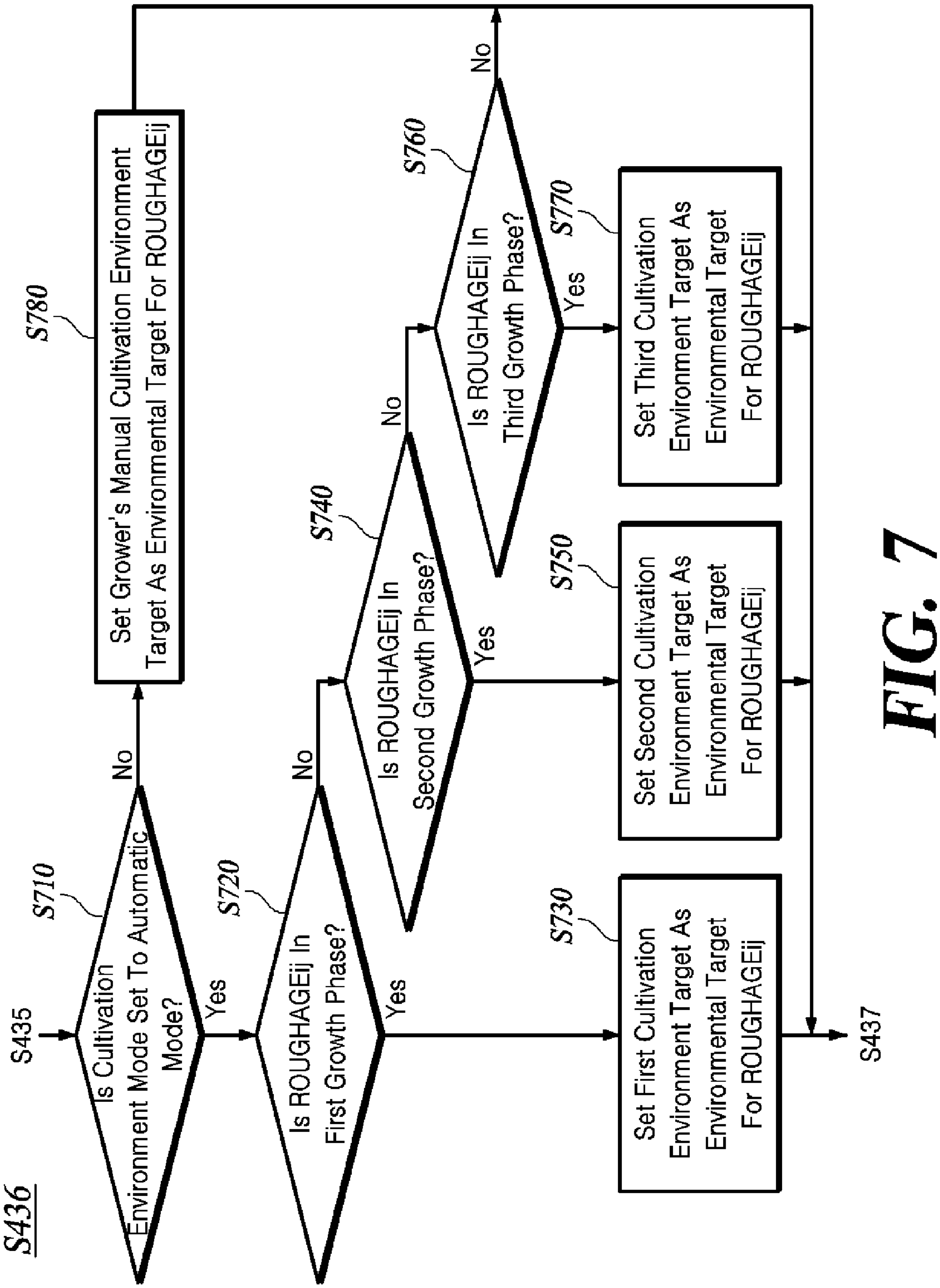
FIG. 7 is a flow chart for describing an example of a process for generating a cultivation environment target.

FIG. 7 is a flow chart for describing an example of a process for generating a cultivation environment target.

Referring to FIGS. 1 to 7, the environmental target generator 350 may determine whether a cultivation environment mode is set to an automatic mode (S710).

When it is determined at step S710 that the cultivation environment mode is set to an automatic mode, the environmental target generator 350 may determine whether roughage in a j-th cultivation floor of an i-th cultivation space is in the first growth phase (S720).

When it is determined at step S720 that the roughage in the j-th cultivation floor of the i-th cultivation space is in the first growth phase, the environmental target generator 350 may set a preset first cultivation environment target as an environmental target for the roughage in the j-th cultivation floor of the i-th cultivation space (S730). For example, the first cultivation environment target may be to maintain the temperature inside a cultivation space at 21.5° C., maintain the humidity inside the cultivation space at 82 to 88%, and keep the inside of the cultivation space under shade.

When it is not determined at step S720 that the roughage in the j-th cultivation floor of the i-th cultivation space is in the first growth phase, the environmental target generator 350 may determine whether the roughage in the j-th cultivation floor of the i-th cultivation space is in the second growth phase (S740).

When it is determined at step S740 that the roughage in the j-th cultivation floor of the i-th cultivation space is in the second growth phase, the environmental target generator 350 may set a preset second cultivation environment target as the environmental target for the roughage in the j-th cultivation floor of the i-th cultivation space (S750). For example, the second cultivation environment target may be to maintain the temperature inside a cultivation space at 21.5° C., maintain the humidity inside the cultivation space at 82 to 88%, and maintain the illuminance of light that irradiates the roughage at 2,500 to 9,000 lux.

When it is not determined at step S740 that the roughage in the j-th cultivation floor of the i-th cultivation space is in the second growth phase, the environmental target generator 350 may determine whether the roughage in the j-th cultivation floor of the i-th cultivation space is in the third growth phase (S760).

When it is determined at step S760 that the roughage in the j-th cultivation floor of the i-th cultivation space is in the third growth phase, the environmental target generator 350 may set a preset third cultivation environment target as the environmental target for the roughage in the j-th cultivation floor of the i-th cultivation space (S770). For example, the third cultivation environment target may be to maintain the temperature inside a cultivation space at 21.5° C., maintain the humidity inside the cultivation space at 82 to 88%, and maintain the illuminance of light that irradiates the roughage at 2,500 to 9,000 lux.

When it is determined at step S710 that the cultivation environment mode is set to a manual mode, the environmental target generator 350 may set a grower's manual environmental target as the environmental target for roughage in a j-th cultivation floor of an i-th cultivation space (S780).

Figure 8:
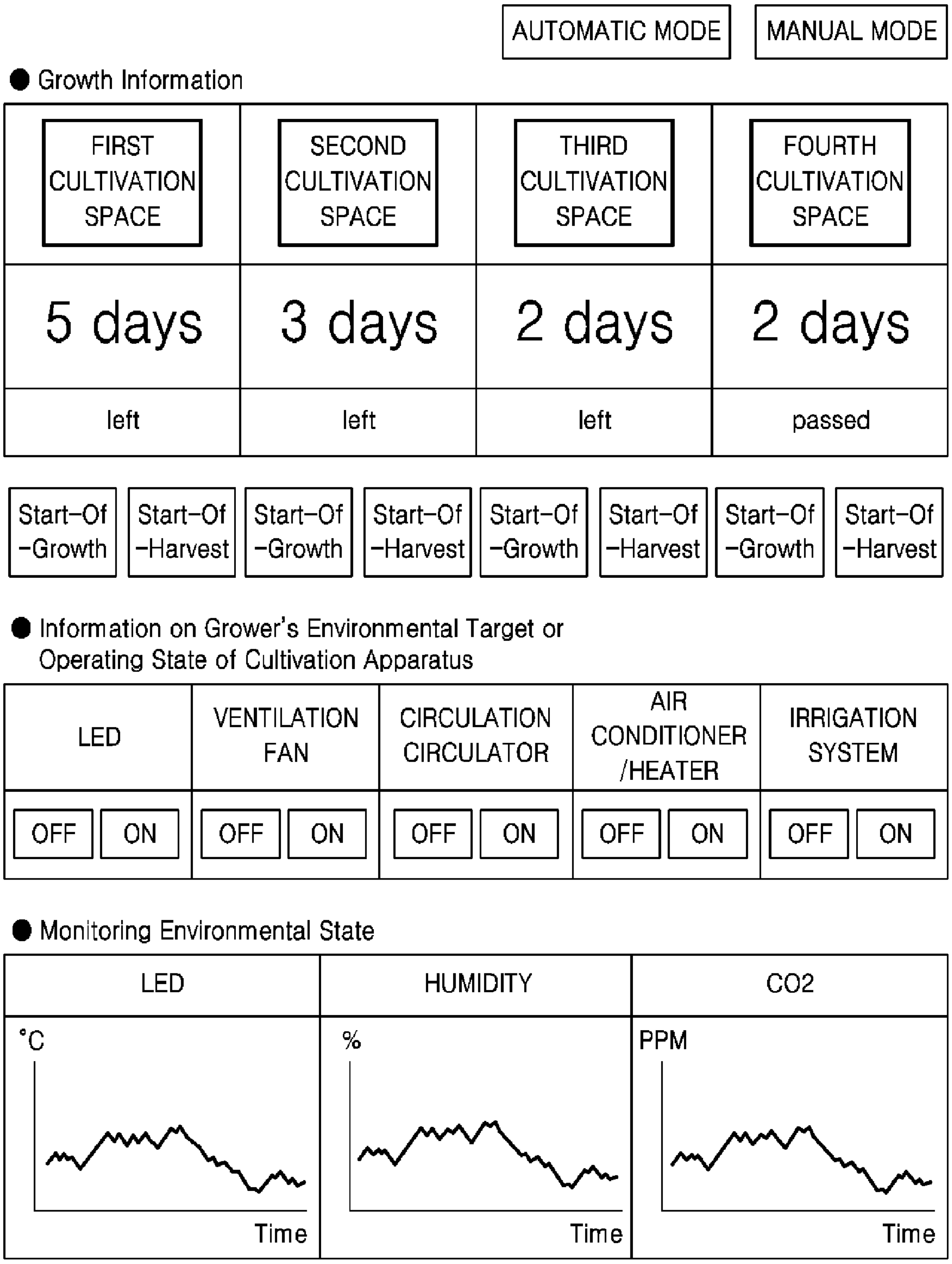
FIG. 8 is a view of a user interface of a cultivator console according to an embodiment of the present disclosure.

FIG. 8 is a view of the user interface of the cultivator console according to an embodiment of the present disclosure.

Referring to FIGS. 1 to 8, the cultivator console 100 may calculate the time remaining until the harvesting phase and the time elapsed from the harvesting phase based on a cultivation environment data set corresponding to cultivation information and may output them to the user interface 110. In addition, because the cultivator console 100 may have a function for a grower to request the start of growing roughage, it may be possible for the grower to remotely control the cultivation apparatus in order to grow the roughage. The grower can start counting the growth time or initialize the growth time by clicking on the start-of-growth request button and/or the start-of-harvest alarm button in the user interface 110.

When a grower sets a cultivation environment mode to an automatic mode, the cultivator console 100 may output information on a current operating state of the cultivation apparatus 200 to the user interface 110 based on a cultivation environment data set corresponding to cultivation information. On the other hand, when the grower sets the cultivation environment mode to a manual mode, the grower may remotely control the cultivation apparatus 200 by creating the grower's environmental target. For example, the grower can remotely control the cultivation apparatus 200 by clicking on the ON button or the OFF button in the user interface 110.

The cultivator console 100 may output information on the environmental state of a cultivation space to the user interface 110 based on a cultivation environment data set corresponding to cultivation information.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

As described above, according to an embodiment of the present disclosure, a cloud-based system for cultivating roughage may enable a grower to cultivate roughage conveniently by remotely controlling a cultivation apparatus.

According to an embodiment of the present disclosure, the cloud-based system for cultivating roughage may enable a grower to control a cultivation apparatus in a cost-effective manner.

The effects of embodiments of the present disclosure are not limited to the above-mentioned effects, and other effects not mentioned will be clearly understood by those skilled in the art from the above description.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, one of ordinary skill would understand that the scope of the claimed invention is not to be limited by the above explicitly described embodiments but by the claims and equivalents thereof.

What is claimed is:

1. A method for cultivating roughage based on a cultivator console and a cultivation server, with a cultivation apparatus for controlling an environment of a cultivation space for cultivating the roughage, the method comprising:

receiving, by the cultivation server, cultivation information including a cultivation environment mode, a grower's manual environmental target, a request for a start of growing the roughage, and an alarm about a start of harvesting the roughage from the cultivator console;

receiving, by the cultivation server, information about an environmental state of the cultivation space and information about an operating state of the cultivation apparatus from the cultivation apparatus;

generating, by the cultivation server, an environmental state value based on the information about the environmental state;

calculating, by the cultivation server, a growth time of the roughage based on the request for the start of growing the roughage and the alarm about the start of harvesting the roughage;

determining, by the cultivation server, a cultivation phase in which the roughage is based on the growth time;

generating, by the cultivation server, an environmental target for the roughage based on the cultivation phase;

calculating, by the cultivation server, a cultivation environment adjustment value for the roughage based on the environmental state value and the environmental target;

transmitting, by the cultivation server, the cultivation environment adjustment value to the cultivation apparatus; and adjusting, by the cultivation apparatus, the environment of the cultivation space by operating at least one of a circulation fan, a ventilation fan, an air conditioner, a lighting, or a spray nozzle based on the cultivation environment adjustment value, wherein calculating of the growth time includes:

initializing, by the cultivation server, the growth time when the request for the start of growing the roughage has not been received from the cultivator console in a previous cycle and has been received from the cultivator console in a current cycle, and increasing, by the cultivation server, the growth time when the request for the start of growing the roughage has been received from the cultivator console in the previous cycle and has been received from the cultivator console in the current cycle.

2. The method of claim 1, wherein the cultivation space is divided based on a sowing time of seeds of the roughage.

3. The method of claim 1, further comprising:

storing, by the cultivation server, a cultivation environment data set including a current time, the growth time, the cultivation phase, the environmental target, and the environmental state value for each cultivation space;

transmitting, by the cultivation server, the information about the operating state and the cultivation environment data set to the cultivator console, the information about the operating state and the cultivation environment data set corresponding to the cultivation information;

receiving, by the cultivator console, the cultivation environment data set corresponding to cultivation information and outputting information on the environmental state of the cultivation space to the user interface; and receiving, by the cultivator console, a command for a remote cultivation control from a grower.

4. The method of claim 3, wherein the receiving of the command for the remote cultivation control includes receiving, by the cultivator console, the cultivation environment mode, the grower's manual environmental target, the request for the start of growing the roughage, and the alarm about the start of harvesting the roughage from the grower, wherein the grower monitors the environmental state of the cultivation space.

5. The method of claim 1, wherein the calculating of the growth time further includes:

maintaining, by the cultivation server, the growth time as the growth time is when the request for the start of growing the roughage has been received from the cultivator console in the previous cycle and the alarm about the start of harvesting the roughage has been received from the cultivator console in the current cycle.

6. The method of claim 1, wherein the determining of the cultivation phase includes:

determining, by the cultivation server, that the roughage is in a first growth phase when the growth time is less than or equal to a first growth time, and determining, by the cultivation server, that the roughage is in a second growth phase when the growth time is greater than the first growth time and is less than or equal to a second growth time.

7. The method of claim 6, wherein the determining of the cultivation phase further includes:

determining, by the cultivation server, that the roughage is in a third growth phase when the growth time is greater than the second growth time and is less than or equal to a third growth time, and determining, by the cultivation server, that the roughage is in a harvesting phase when the growth time is greater than the third growth time.

8. The method of claim 1, wherein the generating of the environmental target includes:

generating, by the cultivation server, the environmental target based on the cultivation phase when the cultivation environment mode is set to an automatic mode, and generating, by the cultivation server, an environmental target according to the grower's manual environmental target when the cultivation environment mode is set to a manual mode.

9. The method of claim 1, wherein the information about the environmental state includes information about at least one of a temperature inside the cultivation space, a humidity inside the cultivation space, an illuminance inside the cultivation space, or whether a nutrient solution supplied to the cultivation tray disposed in the cultivation space leaks.

10. The method of claim 1, wherein the information about the operating state includes information about how the circulation fan, the ventilation fan, the air conditioner, the lighting, and the spray nozzle are operating according to the cultivation environment adjustment value.

11. A system for cultivating roughage having a cultivation apparatus for controlling an environment of a cultivation space for cultivating the roughage, the system comprising:

a cultivator console configured to transmit cultivation information including a cultivation environment mode, a grower's environmental target, a request for a start of growing the roughage, and an alarm about a start of harvesting the roughage; and a cultivation server configured to:

receive the cultivation information from the cultivator console;

receive information about an environmental state of the cultivation space and information about operating state of the cultivation apparatus from the cultivation apparatus;

generate an environmental state value based on the information about the environmental state;

calculate a growth time of the roughage based on the request for the start of growing the roughage and the alarm about the start of harvesting the roughage, wherein calculating the growth time comprises:

initializing the growth time when the request for the start of growing the roughage has not been received from the cultivator console in a previous cycle and has been received from the cultivator console in a current cycle, and increasing the growth time when the request for the start of growing the roughage has been received from the cultivator console in the previous cycle and has been received from the cultivator console in the current cycle;

determine a cultivation phase in which the roughage is based on the growth time;

generate an environmental target for the roughage based on the cultivation phase;

calculate a cultivation environment adjustment value for the roughage based on the environmental state value and the environmental target;

store a cultivation environment data set including a current time, the growth time, the cultivation phase, the environmental target, and the environmental state value for the cultivation space; and transmit the cultivation environment adjustment value to the cultivation apparatus and transmits the cultivation environment data set and the information about the operating state of the cultivation apparatus to the cultivator console, the cultivation environment data set and the information about the operating state of the cultivation apparatus corresponding to the cultivation information, in order to remotely control the cultivation apparatus, wherein the cultivation apparatus is configured to control the environment of the cultivation space by operating at least one of a circulation fan, a ventilation fan, an air conditioner, a lighting, or a spray nozzle based on the cultivation environment adjustment value.

12. The system of claim 11, wherein the cultivation space is divided based on a sowing time of seeds of the roughage.

* * * * *